United States Patent
Beaulieu et al.

(10) Patent No.: US 12,552,020 B2
(45) Date of Patent: Feb. 17, 2026

(54) COLLAPSIBLE PROTRUSIONS HAVING A VARIABLE COEFFICIENT OF FRICTION

(71) Applicants: Toyota Research Institute, Inc., Los Altos, CA (US); Toyota Jidosha Kabushiki Kaisha, Toyota (JP)

(72) Inventors: Andrew Beaulieu, Arlington, MA (US); Naveen Suresh Kuppuswamy, Arlington, MA (US); Jessica Yin, Philadelphia, PA (US)

(73) Assignees: Toyota Research Institute, Inc., Los Altos, CA (US); Toyota Jidosha Kabushiki Kaisha, Toyota Aichi-Ken (JP)

( * ) Notice: Subject to any disclaimer, the term of this patent is extended or adjusted under 35 U.S.C. 154(b) by 0 days.

(21) Appl. No.: 18/644,687

(22) Filed: Apr. 24, 2024

(65) Prior Publication Data
US 2025/0332717 A1    Oct. 30, 2025

(51) Int. Cl.
 *B25J 9/16* (2006.01)
 *B25J 13/08* (2006.01)
 *B25J 15/00* (2006.01)

(52) U.S. Cl.
 CPC .......... *B25J 9/1612* (2013.01); *B25J 13/081* (2013.01); *B25J 15/0033* (2013.01)

(58) Field of Classification Search
 USPC .............. 700/245–264; 73/862.381, 862.471
 See application file for complete search history.

(56) References Cited

U.S. PATENT DOCUMENTS

| | | | |
|---|---|---|---|
| 5,120,101 A | 6/1992 | Vranish | |
| 8,181,540 B2 * | 5/2012 | Loeb | G01L 5/228 901/33 |
| 8,550,519 B2 * | 10/2013 | Mankame | B25J 15/12 294/99.1 |
| 9,370,863 B2 | 6/2016 | Tsuji et al. | |
| 9,375,852 B2 | 6/2016 | Rose | |
| 9,533,419 B1 * | 1/2017 | Strauss | B25J 15/0009 |
| 10,464,218 B2 | 11/2019 | Yoav et al. | |
| 12,246,930 B2 * | 3/2025 | Shiba | B25J 13/088 |
| 2010/0139418 A1 * | 6/2010 | Loeb | G01L 5/228 73/862.046 |
| 2011/0089708 A1 * | 4/2011 | Mankame | B25J 15/12 294/86.4 |
| 2013/0238129 A1 * | 9/2013 | Rose | B25J 19/0029 700/258 |
| 2016/0375590 A1 * | 12/2016 | Lessing | B25J 19/0075 294/196 |
| 2018/0356301 A1 * | 12/2018 | Tomita | G01L 1/04 |
| 2019/0168393 A1 * | 6/2019 | Strauss | B25J 15/12 |

(Continued)

FOREIGN PATENT DOCUMENTS

CN    109476425 A    3/2019

*Primary Examiner* — Jonathan L Sample
(74) *Attorney, Agent, or Firm* — Dinsmore & Shohl LLP

(57) ABSTRACT

A plurality of collapsible protrusions extending from a base including a first end, a second end, a first surface, and an outer surface. The second end is opposite the first end. The first surface is distal from the base. The outer surface is between the first end and the second end. The outer surface has a variable coefficient of friction. The variable coefficient of friction increases in a direction towards the base. The second end has a coefficient of friction greater than the coefficient of friction at the first end.

20 Claims, 4 Drawing Sheets

(56) References Cited

U.S. PATENT DOCUMENTS

| | | | |
|---|---|---|---|
| 2019/0176348 A1* | 6/2019 | Bingham | B25J 15/0004 |
| 2020/0156261 A1* | 5/2020 | Lin | B25J 15/0023 |
| 2020/0171672 A1* | 6/2020 | Nakayama | B25J 15/0253 |
| 2021/0107050 A1* | 4/2021 | Secibovic | B21D 43/105 |
| 2021/0291384 A1* | 9/2021 | Chintalapalli Patta | B25J 15/106 |
| 2022/0234200 A1* | 7/2022 | Narita | B25J 13/083 |
| 2023/0294302 A1* | 9/2023 | Beaulieu | B25J 15/12 294/99.1 |
| 2023/0356415 A1* | 11/2023 | Yu | B25J 15/12 |

\* cited by examiner

COLLAPSIBLE PROTRUSIONS HAVING A VARIABLE COEFFICIENT OF FRICTION

TECHNICAL FIELD

The present specification generally relates to collapsible protrusions and, more specifically, a plurality of collapsible protrusions that include a variable coefficient of friction for enhanced grasping and sensing of objects.

BACKGROUND

Conventional robots may include a plurality of arms, appendages, and so forth, of which can be used to grab and manipulate objects. These robotic end effectors include surfaces or shapes that allow the robot to grasp and hold an object for that robot's specific needs.

Traditional robotic end effectors typically have coefficients of friction to ensure stable grasping and object manipulation. However, this limitation in the coefficient of friction restricts the range of grasp types and the manipulation capabilities of the robots. Objects that require controlled slippage, or those with properties that can be inferred from controlled slippage, pose challenges for existing robotic systems.

SUMMARY

In one embodiment, a plurality of collapsible protrusions extend from a base and may include a first end, a second end, a first surface, and an outer surface. The second end is opposite the first end. The first surface is distal from the base. The outer surface is between the first end and the second end. The outer surface has a variable coefficient of friction. The variable coefficient of friction increases in a direction towards the base. The second end has a coefficient of friction greater than the coefficient of friction at the first end.

In another embodiment, a method of applying a variable coefficient of friction of a collapsible gripper may include a base and a plurality of collapsible protrusion extending from the base. Each of the plurality of collapsible protrusions include a first end, a second end, a first surface, and an outer surface. The second end is opposite the first end. The first surface is distal from the base. The outer surface is between the first end and the second end. The variable coefficient of friction increases in a direction towards the base. The second end has a coefficient of friction greater than the coefficient of friction at the first end. The method includes detecting, with a sensor, contact between the plurality of collapsible protrusions and an object, and applying a force between the base and the object, based upon the detected contact, as to move the plurality of collapsible protrusions from a non-collapsed state to a collapsed state.

In yet another embodiment, a collapsible gripper may include one or more processors, a base, a plurality or collapsible protrusions, and non-transitory computer-readable medium. The plurality of collapsible protrusions extend from the base and include a first end, a second end, a first surface, and an outer surface. The second end is opposite the first end. The first surface is distal from the base. The outer surface is between the first end and the second end. The outer surface has a variable coefficient of friction. The variable coefficient of friction increases in a direction towards the base. The second end has a coefficient of friction greater than the coefficient of friction at the first end. The non-transitory computer-readable medium stores instructions, that, when executed by the one or more processors, cause the processors to detect, with a sensor, contact between the plurality of collapsible protrusions and an object, and apply a force between the base and the object, based upon the detected contact, as to move the plurality of collapsible protrusions from a non-collapsed state to a collapsed state.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
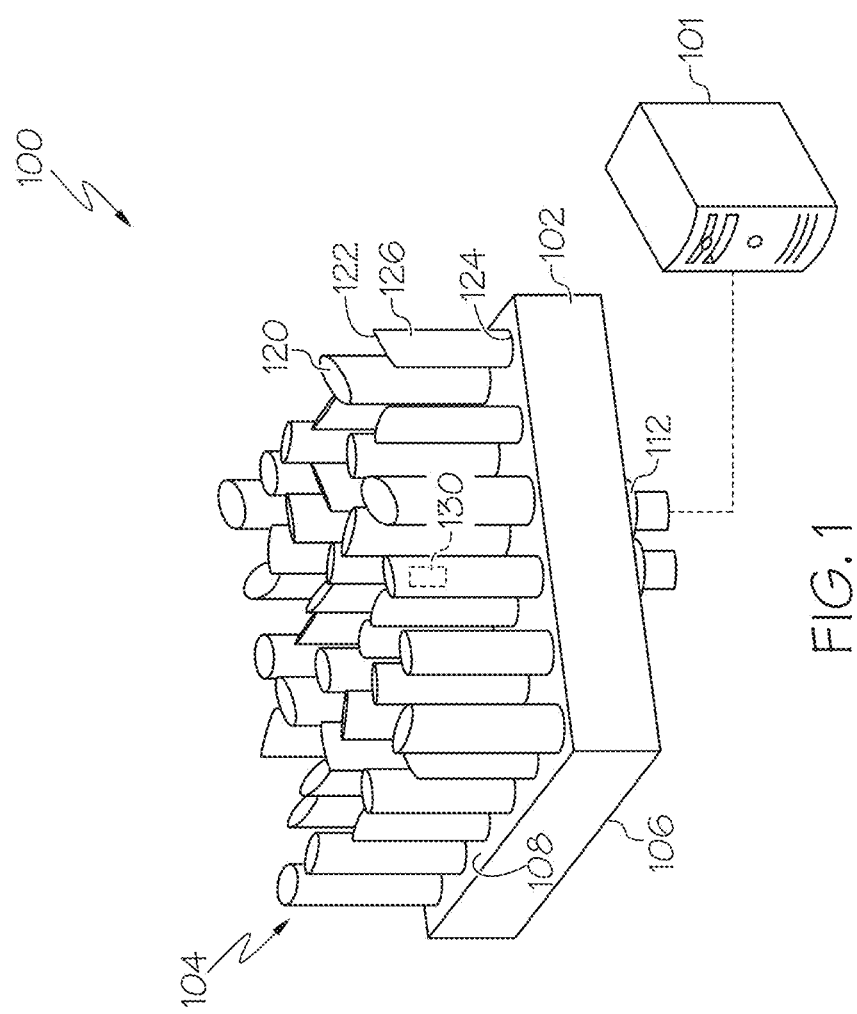
FIG. 1 schematically depicts a perspective view of a plurality of collapsible protrusions according to one or more embodiments described and illustrated herein.

When grasping an object, a human can allow an object to slide easily through their fingers. A human applies varying degrees of force to an object, allowing the objects to move more or less freely within the hand. This allows for the person to touch different surfaces of the object, allows a person to properly grasp and hold the object, and allows for the person to gain useful information about the object as it moves though the hand.

Robots are commonly equipped with end effectors which are configured to perform certain tasks. For example, an end effector of a robotic arm may be configured as a human hand, or as a two-fingered gripper. However, robots do not have the varying levels of touch sensitivity as do humans. Robotic end effectors are designed with a fixed coefficient of friction to ensure stable grasping and object manipulation, thus do not allow for an object to move or slide through the end effector for proper positioning or sensing. Using a traditional gripper, if the object is desired to be in another position, the robotic system release the object and grasp the object again from a different position. This may be time consuming, and may not result in the desired position.

Further, this limits the ability to sense information by sliding an object though different positions within the end effector.

Embodiments of the present disclosure are directed to collapsible members that include a plurality of collapsible protrusions that allow a robot to grasp an object such that an object may slightly slip through the end effector as well as detect properties of the object by monitoring the slippage of the object. Particularly, the collapsible members described herein comprise collapsible protrusions that extend from a base, each of the collapsible protrusions comprising a first end, a second end opposite the first end, a first surface distal from the base, and an outer surface between the first end and the second end having a variable coefficient of friction. The variable coefficient of friction increases in a direction towards the base such that the second end has a coefficient of friction greater than the coefficient of friction at the first end that is distal from the base.

A sensor may be used to detect contact between the plurality of collapsible protrusions and an object. Based on the detected contact, a force may be applied as to move the collapsible protrusion from a non-collapsed state to a collapsed state and allow to allow the object to move as desires through the collapsible member.

Various embodiments of collapsible member and plurality of collapsible protrusions are described in detail below. Whenever possible, the same reference numerals will be used throughout the drawings to refer to the same or like parts.

Referring now to FIG. 1, an example collapsible member 100 in a non-collapsed state of the present disclosure, according to one or more embodiments, is illustrated. In embodiments, the collapsible member 100 includes a base 102, a plurality of collapsible protrusions 104, one or more sensors 130, and a connection 112. The base 102 includes a top surface 108 and a bottom surface 106 opposite the top surface 108. The plurality of collapsible protrusions 104 extend from the top surface 108 of the base 102. Each of the plurality of collapsible protrusions 104 includes a first end 122, a second end 124 opposite the first end 122, a top surface 120 distal to the base 102 and an outer surface 126 between the first end 122 and second end 124. While the sensor 130 is shown within the collapsible protrusion 104, it should be understood that the sensor 130 may be located in any appropriate location on the collapsible member 100.

In embodiments, the outer surface 126 of the collapsible protrusions 104 has a variable coefficient of friction. The variable coefficient of friction increases in a direction towards the base 102 such that the second end 124 has a coefficient of friction greater than the coefficient of friction at the first end 122. In some embodiments, the first surface 120 may have coefficient of friction different than the coefficient of friction of the outer surface 126. In such embodiments, the coefficient of friction of the first surface 120 is less than the coefficient of friction of the outer surface 126. Further, in some embodiments, the first surface 120 may be a silicone bubble membrane with a variable coefficient of friction.

In embodiments, the plurality of collapsible protrusions 104 may be made of silicone. In some embodiments, the silicone may be heat treated, embedded, crystalized, treated with an additive or any other method of creating a variable coefficient of friction. The plurality of collapsible protrusions 104 may be clear or opaque. Is some embodiments, the plurality of collapsible protrusions 104 may be colored with pigments for visual tracking of an object in contact with the plurality of collapsible protrusions 104. Further, it should be understood that the plurality of collapsible protrusions 104 may be made of any suitable material or rubber like substance.

Figure 3:
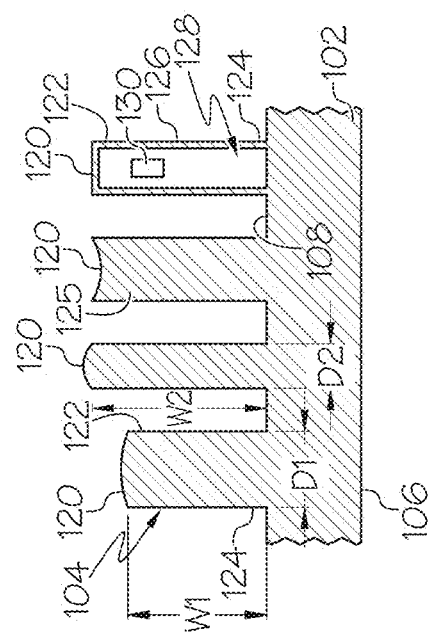
FIG. 3 depicts a cross-sectional view of an example of some of the plurality of collapsible protrusion of FIG. 1, including a sensor, according to one or more embodiments described and illustrated herein.

Referring now to FIG. 3, a cross-sectional view of an example of the plurality of collapsible protrusions 104 are illustrated. In embodiments, each collapsible protrusion 104 may be a different shape and size. The different shapes and sizes may allow for additional variations in the coefficient of friction. The variation of coefficient of friction for the plurality of collapsible protrusions 104 allow for control over the grip and slippage of objects through the collapsible member 100. For example, a collapsible protrusion 104 having a different shape will affect the object 200 differently. As such, the controller 101, as described below, can used each shape to control the direction of movement of the object 200. While substantially cylindrical shapes are depicted, it should be understood that the collapsible protrusions 104 may be any appropriate shape.

As seen in FIG. 3, in some embodiments the collapsible protrusion 104 further comprises a hollow inner portion 128 or a solid inner portion 125. The first surface 120 of some of the plurality of collapsible protrusions 104 may be convex and the first surface 120 of other of the plurality of collapsible protrusions 104 may be concave. In other embodiments, the first surface 120 of the collapsible protrusion 104 may be flat. A diameter $D_1$ of some of the plurality of collapsible protrusions 104 may be greater than the diameter $D_2$ of other of the plurality of collapsible protrusions 104. In some embodiments, a height $H_1$ of some of the plurality of collapsible protrusions 104 may be greater than the height $H_2$ of other of the plurality of collapsible protrusions 104. It should be understood, that while the collapsible protrusions 104 are depicted with different shapes in FIG. 3, in embodiments, the plurality of collapsible protrusions 104 may all have the same shape.

Referring now to FIGS. 1 and 3, a sensor 130 may be provided within the collapsible member 100 in some embodiments. For example, a RBG sensor may be used to monitor diffraction to track the contact between the outer surface 126 and the object 200. Other sensors may include, but are not limited to, pressure sensors, deformable sensors, infrared sensors, and the like. In some embodiments, a metal may be embedded within some of the plurality of collapsible protrusions 104. These sensors 130 allow the controller 101 to track the proximity of the object 200 and communicate any adjustments, as described in further detail below. In some embodiments, the sensors 130 further detect properties of the object 200 by monitoring the slippage of the object 200.

In embodiments, a connection 112 may be installed on a bottom surface 106 of the base 102. In embodiments, these connections may be part of a larger autonomous robot or robotic system (not shown). For example, the example collapsible member 100 may be positioned on the arms, legs, torso, and so forth, of an autonomous robot that is designed and configured to interact with one or more objects that are external to the example collapsible member 100.

Figure 2A:
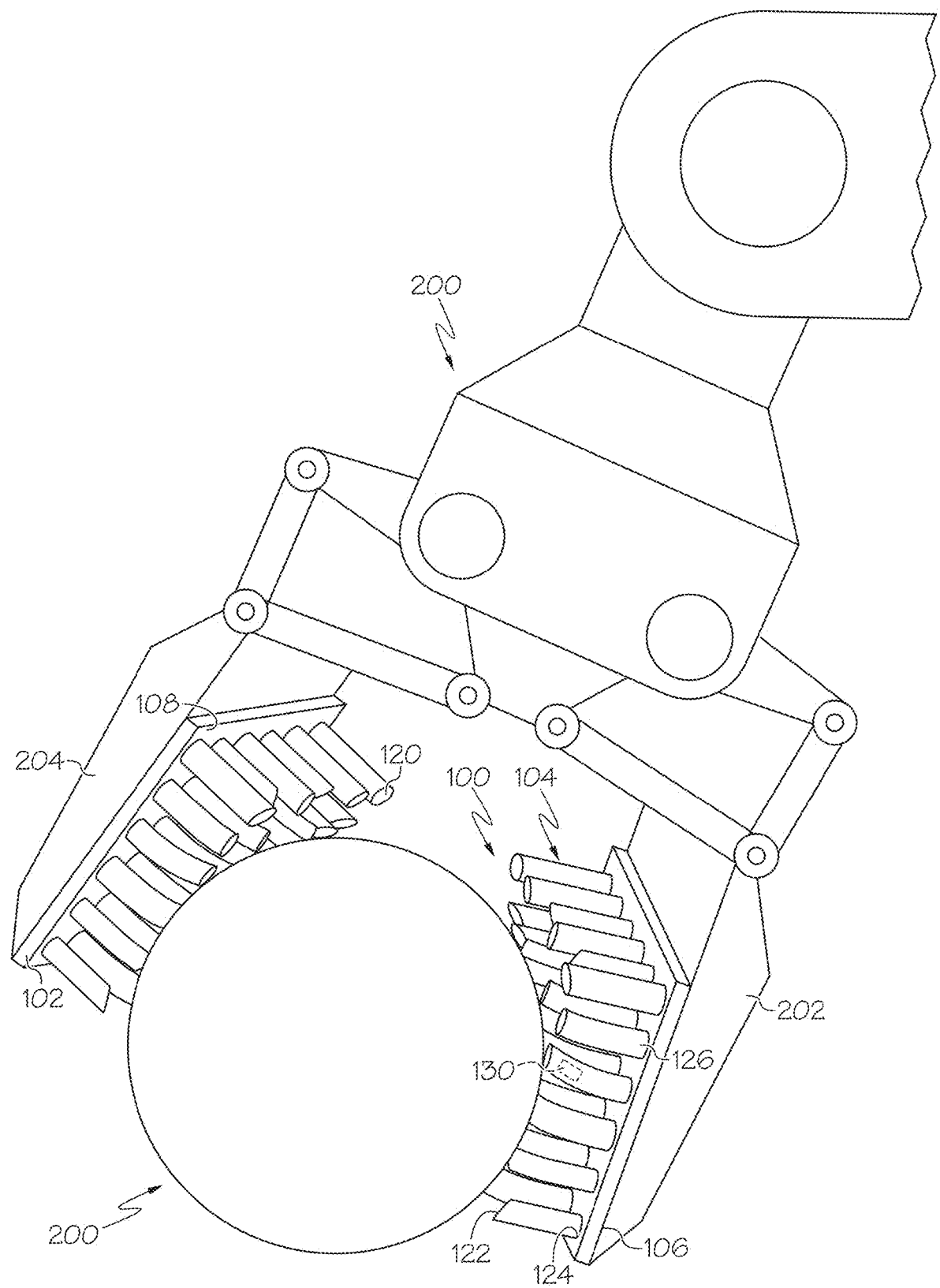
FIG. 2A schematically depicts a perspective view of a robotic arm with an end effector including a collapsible grip comprising the plurality of collapsible protrusions of FIG. 1 in a collapsed state, according to one or more embodiments described and illustrated herein.
Figure 2B:
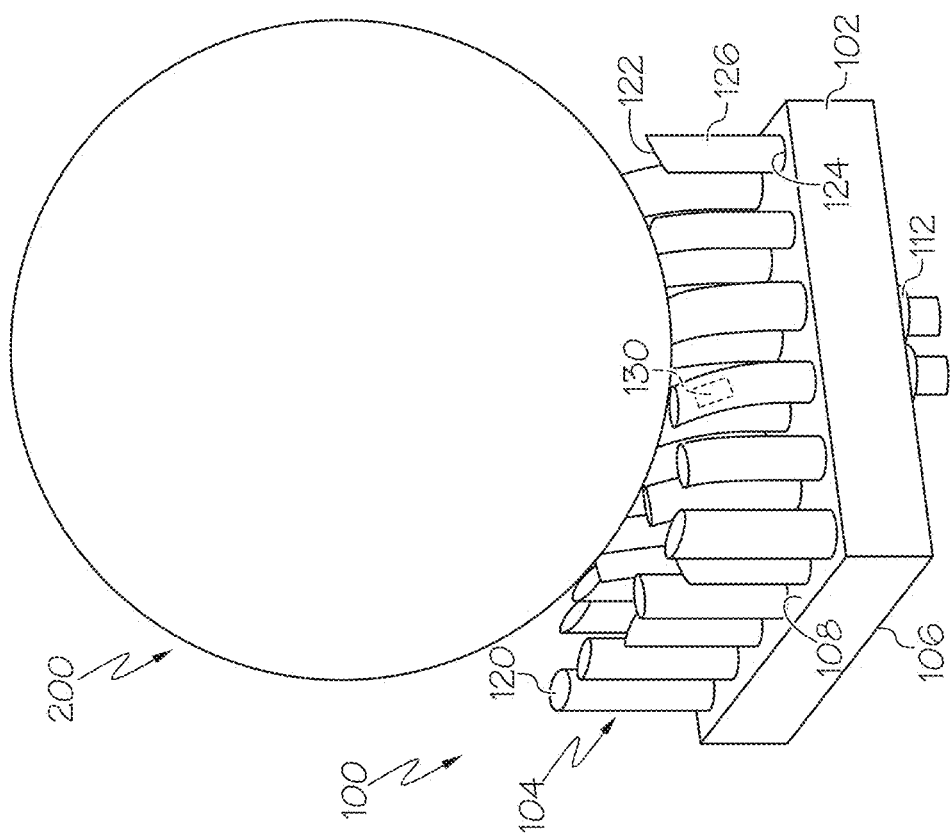
FIG. 2B schematically depicts a perspective view of the plurality of collapsible protrusions of FIG. 2A in the collapsed state, according to one or more embodiments described and illustrated herein.

Referring now to FIGS. 2A and 2B, an example collapsible member 100 in a collapsed state of the present disclosure, according to one or more embodiments, is illustrated. In the collapsed state, the object 200 is pressed against the plurality of collapsible protrusions 104. The collapsible protrusions 104 bend or otherwise deform. When the collapsible protrusions 104 bend, the outer surface 126 contacts the object 200. Thus, a higher coefficient of friction is in contact with the object 200 from the outer surface 126 of the collapsible protrusion 104. In some embodiments, in the collapsed state, the object experiences a higher stiction but is still able to slide. In other embodiments, the object is not able to more in the collapsed state.

As seen in FIG. 2A, in embodiments, the collapsible member 100 may be a two-finger gripper 200 of a robot end effector comprising a first finger 202 and a second finger 204. In some of these embodiments, the collapsible member 100 may include the plurality of collapsible protrusions 104 located on each of the two fingers 202, 204 of the two-finger gripper 200, where the bottom surface 106 of the base 102 is coupled to either or both of the first finger 202 and the second finger 204. While a two-finger gripper 200 is depicted in FIG. 2A, it should be understood that any number of fingers of a robotic end effector may bay be used, including three fingers or four fingers.

Now referring to FIGS. 1, 2A, and 2B the collapsible member 100 is configured to move from a non-collapsed state to a collapsed state upon the application of an amount of force between the collapsible member 100 and the object 200. In embodiments, the plurality of collapsible protrusions 104 are configured to apply a first friction upon an object 200 in a non-collapsed state and a second friction upon the object 200 in a collapsed state. For example, the first friction may allow the object 200 to slide through the collapsible member 100 and the second friction may cause the object 200 to experience a greater stiction and hold in place within the collapsible member 100.

In embodiments, the greater amount of force applied between the collapsible member 100 and object 200, the greater the displacement of the plurality of collapsible protrusions 104. Thus, the object 200 will be in greater contact with more of the outer surface 126 of the collapsible protrusion 104 at a location closer to the second end 124, of which has a higher coefficient of friction. As such, the greater amount of force applied between the collapsible member 100 and the object 200 causes a greater overall coefficient of friction of the collapsible member 100.

The controller 101, as described below, may cause the collapsible member 100 to apply a force between the collapsible member 100 and the object 200. For example, to apply a coefficient of friction to appropriately move the object 200 through the collapsible member 100. The sensor 130 detects the contact between the plurality of collapsible protrusions 104 and the object 200. The controller 101 then applies a force upon the base 102 against the object 200, based upon the detected contact, as to move the plurality of collapsible protrusions 104 from a non-collapsed state to a collapsed state.

In some embodiments, some of the collapsible protrusions 104 may be shaped to have coefficients of friction to allow objects to be turned or otherwise maneuvered by the collapsible members 100. For example, the collapsible member 100 may be shaped as to maneuver an object 200 to slide to a particular collapsible protrusion 104 with a high coefficient of friction, causing the object 200 to turn.

As seen in the above embodiment, the plurality of collapsible protrusions 104 extend from the base 102 on a collapsible member 100. However, it should be understood that the collapsible protrusions 104 having an outer surface 126 with a variable coefficient of friction may be positioned at any location on the robot.

Figure 4:
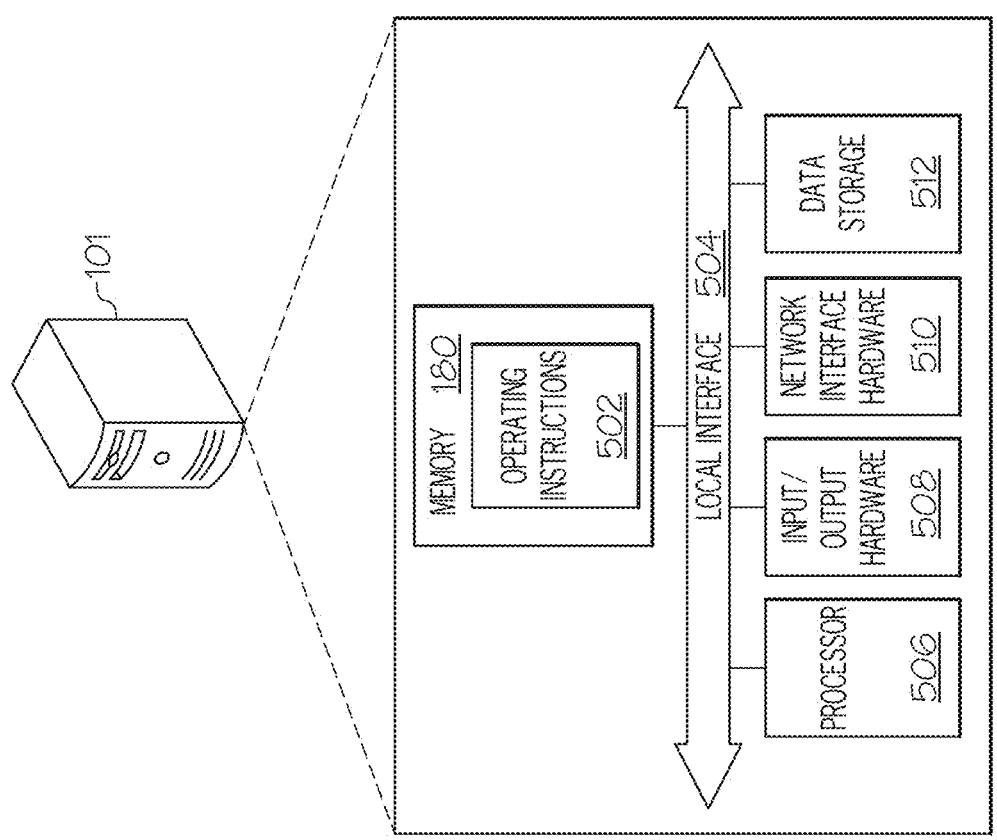
FIG. 4 depicts a non-limiting example of a controller that is configured to perform one or more of the features and functionalities described in the present disclosure, according to one or more embodiments described and illustrated herein.

Turning now to FIG. 4, a non-limiting example of the controller 101 that is configured to perform one or more of the features and functionalities described in the present disclosure, according to one or more embodiments is depicted. As illustrated, the controller 101 includes a processor 506, input/output hardware 508, a network interface hardware 510, a data storage component 512, and memory 180.

The memory 180 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the embodiment, these non-transitory computer-readable media may reside within the computing device and/or a device that is external to the controller 101. The memory 180 may store operating instructions 502, each of which may be embodied as a computer program, firmware, and so forth. The memory 180 may comprise RAM, ROM, flash memories, hard drives, or any device capable of storing the operating instructions 502 such that the operating instructions 502 can be accessed by the processor 506.

The operating instructions 502 may comprise logic or algorithm(s) written in any programming language of any generation (e.g., 1GL, 2GL, 3GL, 4GL, or 5GL) such as, for example, machine language that may be directly executed by the controller 101, or assembly language, object-oriented programming (OOP), scripting languages, microcode, etc., that may be compiled or assembled into machine readable and executable instructions and stored on the memory 180. Alternatively, the operating instructions 502 may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The processor 506 along with the memory 180 may operate as a controller for the controller 101.

A local interface 504 may be implemented as a bus or other communication interface to facilitate communication among the components of the controller 101. The processor 506 may include any processing component operable to receive and execute operating instructions 502 from the memory 180 (such as from a data storage component 512 and/or the memory 180). Accordingly, the processor 506 may be an integrated circuit, a microchip, a computer, or any other computing device. As described above, the input/output hardware 508 may include and/or be configured to interface with speakers, microphones, and/or other input/output components.

The operating instructions 502 may include an operating system and/or other software for managing components of the controller 101. In some embodiments, one or more of the components may reside external to the controller 101 or within other devices. It should be understood that, while the controller 101 is illustrated as a single device, this is also merely an example. As an example, one or more of the functionalities and/or components described herein may be provided by the controller 101. Depending on the particular embodiments, any of these devices may have similar components as those depicted in FIG. 1. To this end, any of these devices may include instructions for performing the functionality described herein.

It should now be understood that embodiments of the present disclosure are directed to collapsible members that include a plurality of collapsible protrusions having a variable coefficient of friction that allows a robot to grasp an object such that an object may slightly slip through the end effector. The collapsible protrusions may be made of silicone of differing shapes. Sensors detect contact between the object and collapsible members and a controller applies a force to move the plurality of collapsible protrusions from a non-collapsed state to a collapsed state based on the detected contact.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A substrate for a robot end effector, the substrate comprising:
   a base;
   a plurality of collapsible protrusions extending from the base, each of the plurality of collapsible protrusions comprising:
   a first end;
   a second end opposite the first end;
   a first surface distal from the base; and
   an outer surface between the first end and the second end, the outer surface configured to provide a variable coefficient of friction increasing in a direction toward the base, wherein the first end is configured to provide a first coefficient of friction and the second end is configured to provide a second coefficient of friction that is greater than the first coefficient of friction.

2. The substrate of claim 1, wherein the plurality of collapsible protrusions are formed of silicon.

3. The substrate of claim 1, wherein the plurality of collapsible protrusions are configured to apply a first friction upon an object in a non-collapsed state and a second friction upon the object in a collapsed state.

4. The substrate of claim 1, wherein some of the plurality of collapsible protrusions further comprises a hollow inner portion.

5. The substrate of claim 4, wherein some of the plurality of collapsible protrusions further comprises an RBG sensor that monitors diffraction.

6. The substrate of claim 1, wherein the first surface of some of the plurality of collapsible protrusions are convex and the first surface of other of the plurality of collapsible protrusions are concave.

7. The substrate of claim 1, wherein a diameter at the first surface of some of the plurality of collapsible protrusions is greater than the diameter at the first surface of other of the plurality of collapsible protrusions.

8. A method comprising:
   providing a plurality of collapsible protrusions extending from a base, each of the plurality of collapsible protrusions comprising:
   a first end;
   a second end opposite the first end;
   a first surface distal from the base; and
   an outer surface between the first end and the second end, the outer surface configured to provide a variable coefficient of friction increasing in a direction toward the base, wherein the first end is configured to provide a first coefficient of friction and the second end is configured to provide a second coefficient of friction that is greater than the first coefficient of friction;
   detecting, with a sensor, contact between the plurality of collapsible protrusions and an object; and
   applying a force between the base and the object, based upon the detected contact, as to move the plurality of collapsible protrusions from a non-collapsed state to a collapsed state.

9. The method claim 8, wherein the plurality of collapsible protrusions are formed of silicon.

10. The method claim 8, wherein the plurality of collapsible protrusions are configured to apply a first friction upon the object in the non-collapsed state and second friction upon the object in the collapsed state.

11. The method claim 8, wherein some of the plurality of collapsible protrusions further comprises a hollow inner portion.

12. The method claim 8, wherein the first surface of some of the plurality of collapsible protrusions are convex and the first surface of other of the plurality of collapsible protrusions are concave.

13. The method claim 8, wherein a diameter of some of the plurality of collapsible protrusions is greater than the diameter of other of the plurality of collapsible protrusions.

14. A collapsible member comprising:
   one or more processors;
   a base;
   a plurality of collapsible protrusions extending from the base, each of the plurality of collapsible protrusions comprising:
   a first end;
   a second end opposite the first end;
   a first surface distal from the base; and
   an outer surface between the first end and the second end, the outer surface configured to provide a variable coefficient of friction increasing in a direction toward the base, wherein the first end is configured to provide a first coefficient of friction and the second end is configured to provide a second coefficient of friction greater than the first coefficient of friction, and a non-transitory computer-readable medium storing instructions that, when executed by the one or more processors, cause the one or more processors to:

detecting, with a sensor, contact between the plurality of collapsible protrusions and an object; and applying a force between the base and the object, based upon the detected contact, as to move the plurality of collapsible protrusions from a non-collapsed state to a collapsed state.

15. The collapsible member of claim 14, wherein the plurality of collapsible protrusions are formed of silicon.

16. The collapsible member of claim 14, wherein the plurality of collapsible protrusions are configured to apply a first friction upon the object in the non-collapsed state and second friction upon the object in the collapsed state.

17. The collapsible member of claim 14, wherein some of the plurality of collapsible protrusions further comprises a hollow inner portion.

18. The collapsible member of claim 17, wherein other of the plurality of collapsible protrusions comprise a solid inner portion.

19. The collapsible member of claim 14, wherein the first surface of some of the plurality of collapsible protrusions are convex and the first surface of other of the plurality of collapsible protrusions are concave.

20. The collapsible member of claim 14, wherein a diameter at the first surface of some of the plurality of collapsible protrusions is greater than the diameter at the first surface of other of the plurality of collapsible protrusions.

* * * * *